Aug. 16, 1949.　　　R. R. GUNDERSON　　　2,479,232
FLUID PRESSURE REDUCING DEVICE
Filed July 25, 1947
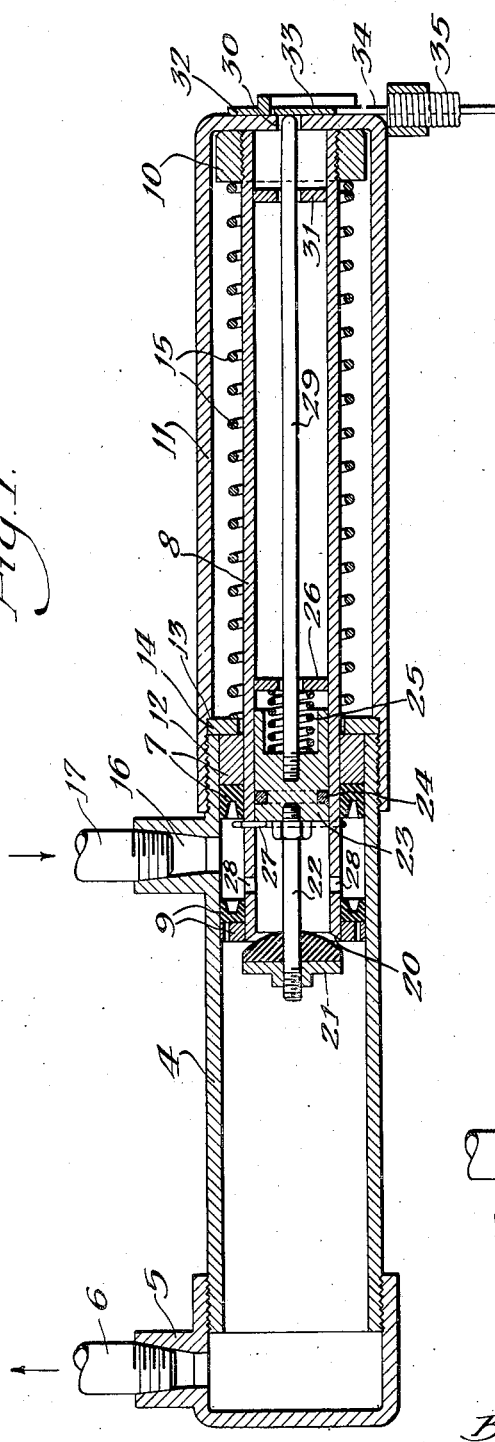
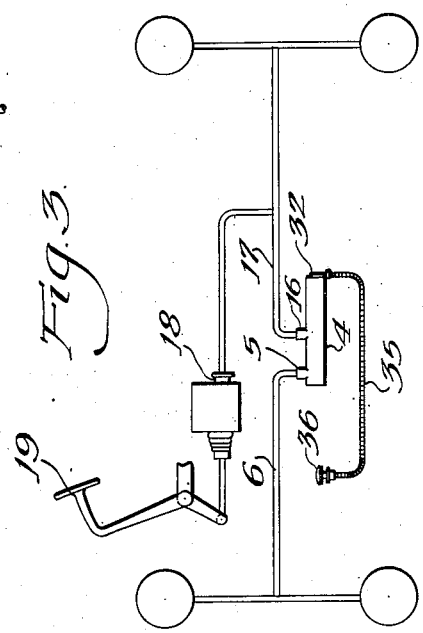
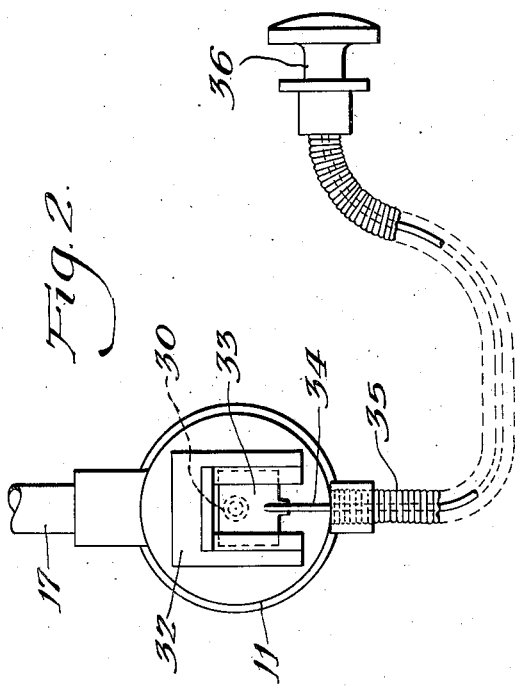
Inventor:
Ralph R. Gunderson
By: Chitton, Schroeder, Merriam & Hofgren
Attorneys

UNITED STATES PATENT OFFICE 2,479,232

FLUID PRESSURE REDUCING DEVICE

Ralph R. Gunderson, Chicago, Ill.

Application July 25, 1947, Serial No. 763,717

4 Claims. (Cl. 60—54.6)

This invention relates to fluid pressure reducing devices, and more particularly to fluid pressure reducing devices adapted for use in connection with a hydraulic brake system for vehicles.

The primary object of the invention is to provide a simple and reliable device for lowering the fluid pressure in a line by use of a piston having a substantially greater effective area on the low pressure side than the effective area on the high pressure side. The low pressure side can be connected to the front wheel brake motors and the high pressure side connected to the rear wheel brake motors, so that the rear brakes would be applied with a greater pressure than the front brakes.

Another object of the invention is to provide a manually operable control, which may be in the cab of a vehicle, so that the device may be rendered ineffective when it is not desired to reduce the pressure going to the front wheel brakes.

In motor vehicles it is the usual practice to adjust hydraulic brakes so that more braking pressure is applied to the front wheels than to the rear wheels. In trucks, particularly with trailers, it has been found that on slippery pavements the front wheels are likely to skid before the brakes are exerting their maximum force on the rear wheels, and as a result there is danger of the driver losing control of the vehicle. By use of the present invention the driver may throw the pressure reducing device into operation whenever desired on slippery pavements, to reduce the brake force on the front wheels. The present invention is an improvement on the device shown in my Patent No. 2,408,513, patented October 1, 1946.

The invention is illustrated in a preferred embodiment in the accompanying drawing, in which—

Figure 1 is a longitudinal sectional view of a pressure reducing device embodying the invention; Fig. 2, a fragmentary end elevational view of the manual control for the device; and Fig. 3, a diagrammatic view showing how the device may be installed in a brake system.

In the embodiment illustrated, a cylinder 4 is provided at its front end with a head 5, to which may be connected a pipe 6 to the front hydraulic brakes of a vehicle. The rear portion of the cylinder is provided with a packing ring and seal 7, through which a hollow piston rod 8 may slide.

A piston head 9 is provided at the front end of the piston rod 8, and a stop ring 10 is threaded to the rear portion of the piston rod. A tubular housing 11 makes a threaded connection with the rear portion of the cylinder, as indicated at 12, and has a shoulder 13 which holds a stop washer 14 against the rear end of the cylinder. A compression spring 15 is provided around the piston rod and bears against the washer 14 and the stop ring 10 so as to urge the piston head 9 to the rear of its travel, which is in front of a high pressure port 16 connected by piping 17 to a master cylinder 18 operated by a foot pedal 19.

The front of the piston rod 8 provides a seat 20 for a valve head 21 provided with a push rod 22 which is fixed to a plunger 23 in the piston rod. The plunger is provided with a usual packing ring 24, and is urged forwardly by a compression spring 25 which bears against a wall 26 fixed within the piston rod 8. Forward travel of the plunger is limited by a stop member 27 provided in the piston rod. Ports 28 are provided in the piston rod between the head 9 and the stop 27.

The plunger 23 is also provided with a rearwardly extending push rod 29 which may extend through an opening 30 provided at the rear of the housing 11. Preferably, a guide 31 is provided in the rear of the piston rod 8 to support the rear portion of the push rod 29.

As will be explained below, the pressure reducing device may be rendered ineffective by holding the valve head 21 in open position by preventing the rod 29 from traveling rearwardly beyond the position shown in Fig. 1. Its travel may be limited by a guide bracket 32 fixed to the rear of the housing 11 and holding a slide 33 connected to a wire 34 in a flexible housing 35, which may lead to a convenient position in the vehicle cab. The end of the wire may be provided with a knob 36, so that when the knob is pulled outwardly the valve 21 will be permitted to close under certain pressure conditions.

When it is desired to reduce the pressure to the front brakes, the knob 36 is pulled out a short distance, so that the rod 29 is free to move rearwardly. When the driver applies pressure to the foot pedal 19, fluid will be forced through the piping 17 and through the unit 4 and the piping 6, so as to apply a slight braking pressure equally to all of the brakes. However, when the pedal pressure is further increased, the plunger 23 will move rearwardly to close the valve, and the piston head 9 will begin to travel forwardly against the action of the compression spring 15 and, as the front area of the piston 9 is greater than its effective rear area, the pressure in the line 17 will have to be greater than the pressure in the pipe 6. When the pedal pressure is released, the piston will move rearwardly, due to the action of the spring 15, and the valve and piston will again open. If the knob 36 is pushed in so that the plunger cannot close the valve and piston, the device will be rendered ineffective and the same pressure will be applied to all of the brakes.

In the drawing the plunger 22 has been shown as a piston, but it will be understood that a diaphragm may be substituted, if desired, because the movement is relatively small.

The foregoing detailed description is given for clearness of understanding only, and no unnecessary limitations should be understood therefrom, for some modifications will be obvious to those skilled in the art.

I claim:

1. A fluid pressure reducing device comprising: a cylinder member provided at its rear portion with a packing ring seal; a rearwardly extending tubular housing mounted on the rear of said cylinder member; a hollow piston rod extending through said packing ring and having a piston head at its front end in the cylinder; a guide member secured to the rear of said piston rod and making slidable engagement with said housing; a compression spring around said piston rod and bearing against the rear portion of the cylinder and against said guide member to urge said piston rod rearwardly; a valve in the front end of the piston rod provided with an operating plunger in said piston rod; a spring urging said valve to open position; a fluid port in said cylinder in front of the front travel of said piston head and adapted to be connected to hydraulic brake motors; and another fluid port in the cylinder, in back of the rear travel of the piston head, and adapted to be connected to a pedal actuated master cylinder.

2. A fluid pressure reducing device comprising: a cylinder member provided at its rear portion with a packing ring seal; a hollow piston rod extending through said packing ring and having a piston head at its front end; a compression spring urging said piston rod rearwardly; a valve in the front end of the piston rod and provided with an operating plunger in said piston rod; a spring urging said valve to open position; a port in the piston rod between the piston head and said plunger; a fluid port in said cylinder in front of the front travel of said piston head and adapted to be connected to hydraulic brake motors; another fluid port in the cylinder, in back of the rear travel of the piston head, and adapted to be connected to a pedal actuated master cylinder; and a manually operable control for holding the valve open when the piston rod is near the rear end of its travel.

3. A device as specified in claim 2, in which the plunger is provided with a rearwardly extending push rod in the piston rod, and the manual control includes a stop for limiting the rearward travel of said push rod.

4. A device as specified in claim 2, in which the plunger is provided with a rearwardly extending push rod in the piston rod, and the manual control comprises a slide on the rear of the housing for limiting the rearward travel of said push rod and having an operating connection with a remotely positioned knob.

RALPH R. GUNDERSON.

REFERENCES CITED

The following references are of record in the file of this patent:

UNITED STATES PATENTS

| Number | Name | Date |
|---|---|---|
| 2,144,020 | Hunt | Jan. 17, 1932 |
| 2,219,765 | Chase | Oct. 29, 1940 |